United States Patent
Tokoro et al.

(10) Patent No.: US 10,727,484 B2
(45) Date of Patent: Jul. 28, 2020

(54) CATHODE ACTIVE SUBSTANCE USED FOR LITHIUM ION SECONDARY BATTERY, CATHODE INCLUDING SAME, AND LITHIUM ION SECONDARY BATTERY PROVIDED WITH CATHODE

(71) Applicant: HITACHI METALS, LTD., Tokyo (JP)

(72) Inventors: Hisato Tokoro, Tokyo (JP); Takashi Nakabayashi, Tokyo (JP); Shuichi Takano, Tokyo (JP); Shin Takahashi, Tokyo (JP); Akira Gunji, Tokyo (JP); Tatsuya Toyama, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 133 days.

(21) Appl. No.: 15/756,328

(22) PCT Filed: Apr. 27, 2017

(86) PCT No.: PCT/JP2017/016837
§ 371 (c)(1),
(2) Date: Feb. 28, 2018

(87) PCT Pub. No.: WO2017/208703
PCT Pub. Date: Dec. 7, 2017

(65) Prior Publication Data
US 2018/0261840 A1    Sep. 13, 2018

(30) Foreign Application Priority Data
May 30, 2016  (JP) .................... 2016-107846

(51) Int. Cl.
*H01M 4/525*   (2010.01)
*H01M 4/505*   (2010.01)
(Continued)

(52) U.S. Cl.
CPC ............ *H01M 4/525* (2013.01); *C01G 53/50* (2013.01); *C04B 35/01* (2013.01);
(Continued)

(58) Field of Classification Search
CPC ...... H01M 4/525; H01M 4/485; H01M 4/505; H01M 10/0525; H01M 4/131;
(Continued)

(56) References Cited

U.S. PATENT DOCUMENTS 8,685,289 B2 *  4/2014  Malcus ............... H01M 4/1391
                                                252/518.1
9,090,481 B2   7/2015  Satoh
(Continued)

FOREIGN PATENT DOCUMENTS

EP     1624509 A1    2/2006
EP     2819226 A1   12/2014
(Continued)

OTHER PUBLICATIONS

Machine English translation of JP 2014-067546 (Year: 2014).*
(Continued)

*Primary Examiner* — Michael L Dignan
(74) *Attorney, Agent, or Firm* — Volpe and Koenig, P.C.

(57) ABSTRACT

Provided are a cathode active substance used for a lithium ion secondary battery capable of suppressing an increase in an internal resistance inside the battery caused following charge/discharge cycles, a cathode including the cathode active substance, and a lithium ion secondary battery provided with the cathode. The cathode active substance includes a lithium composite compound represented by Formula: $Li_{1+\alpha}Ni_xCo_yM^1_{1-x-y-z}M^2_zO_{2+\beta}$. When Pi is defined as porosity with respect to an opening diameter of 0.6 μm or less and measured by subjecting the active substance to a mercury press-in method, and Pp is defined as porosity with (Continued)

respect to the same diameter and measured by filling the active substance in a mold with an inner diameter of 10 mm, pressing the filled substance by a load of 40 MPa, and subjecting the pressed substance to the same method, a value of Pp/Pi is 1.5 or less.

4 Claims, 3 Drawing Sheets

(51) Int. Cl.
*C04B 35/626* (2006.01)
*C04B 35/01* (2006.01)
*H01M 4/52* (2010.01)
*H01M 4/38* (2006.01)
*H01M 4/48* (2010.01)
*H01M 4/02* (2006.01)
*H01M 4/50* (2010.01)
*C01G 53/00* (2006.01)
*H01M 4/131* (2010.01)
*H01M 10/0525* (2010.01)

(52) U.S. Cl.
CPC ...... *C04B 35/6261* (2013.01); *C04B 35/6262* (2013.01); *C04B 35/62605* (2013.01); *H01M 4/02* (2013.01); *H01M 4/382* (2013.01); *H01M 4/48* (2013.01); *H01M 4/50* (2013.01); *H01M 4/505* (2013.01); *H01M 4/52* (2013.01); *C01P 2004/61* (2013.01); *C01P 2006/12* (2013.01); *C01P 2006/14* (2013.01); *C01P 2006/40* (2013.01); *C04B 2235/3203* (2013.01); *C04B 2235/3206* (2013.01); *C04B 2235/3217* (2013.01); *C04B 2235/3224* (2013.01); *C04B 2235/3232* (2013.01); *C04B 2235/3244* (2013.01); *C04B 2235/3251* (2013.01); *C04B 2235/3256* (2013.01); *C04B 2235/3262* (2013.01); *C04B 2235/3275* (2013.01); *C04B 2235/3279* (2013.01); *H01M 4/131* (2013.01); *H01M 10/0525* (2013.01); *H01M 2004/028* (2013.01)

(58) Field of Classification Search
CPC ............. H01M 2004/028; C01G 53/50; C01P 2004/61; C01P 2006/12; C01P 2006/14; C01P 2006/40; C04B 35/6261; C04B 35/01; C04B 35/6262; C04B 35/6205
See application file for complete search history.

(56) References Cited

U.S. PATENT DOCUMENTS

| | | |
|---|---|---|
| 2005/0158546 A1 | 7/2005 | Shizuka |
| 2008/0182169 A1 | 7/2008 | Shizuka |
| 2012/0003542 A1 | 1/2012 | Konishi et al. |
| 2013/0189581 A1* | 7/2013 | Imaizumi ............. C01G 23/002 429/223 |
| 2014/0054495 A1 | 2/2014 | Paulsen et al. |
| 2015/0004489 A1* | 1/2015 | Song ..................... H01M 4/505 429/219 |
| 2015/0021518 A1 | 1/2015 | Kokado et al. |
| 2016/0099460 A1 | 4/2016 | Toyama et al. |
| 2017/0098821 A1 | 4/2017 | Kokado et al. |
| 2017/0125808 A1 | 5/2017 | Blangero et al. |
| 2017/0256789 A1* | 9/2017 | Kao ..................... H01M 4/043 |

FOREIGN PATENT DOCUMENTS

| | | | | |
|---|---|---|---|---|
| JP | 2012-014887 A | | 1/2012 | |
| JP | 2012-253009 A | | 12/2012 | |
| JP | 2014-067546 | * | 4/2014 | ........... H01M 4/525 |
| JP | 2014-509046 A | | 4/2014 | |
| JP | 2016-054101 A | | 4/2016 | |
| KR | 20160041004 A | | 4/2016 | |
| WO | 2011/108389 A1 | | 9/2011 | |
| WO | 2012/011212 A1 | | 1/2012 | |
| WO | 2015/189740 A1 | | 12/2015 | |

OTHER PUBLICATIONS

Smith et al. "Electrodes based on Magnéli phase titanium oxides: the properties and applications of Ebonex® materials." Journal of Applied Electrochemistry 28 (1998) 1021-1033 (Year: 1998).*
Gruber et al. "Magnetoresistance and Conductivity in the Binary System Titanium-Oxygen." phys. stat. sol. (a) 75, 511 (Year: 1983).*
Xu et al. "Structures, preparation and applications of titanium suboxides." RSC Adv. 2016, 6, 79706-79721 (Year: 2016).*
International Search Report for WO 2017/208703 A1, dated Aug. 1, 2017.
Korean Office Action dated Feb. 26, 2019 for the Korean Patent Application No. 10-2018-7005526.
Extended European Search Report dated Oct. 21, 2019 for the European Patent Application No. 17806262.6.

* cited by examiner

CATHODE ACTIVE SUBSTANCE USED FOR LITHIUM ION SECONDARY BATTERY, CATHODE INCLUDING SAME, AND LITHIUM ION SECONDARY BATTERY PROVIDED WITH CATHODE

FIELD OF INVENTION

The present invention relates to a cathode active substance used for a lithium ion secondary battery, a cathode including the cathode active substance, and a lithium ion secondary battery provided with the cathode.

BACKGROUND ART

Non-aqueous secondary batteries in which a non-aqueous electrolyte mediates electric conduction between electrodes include a lithium ion secondary battery. A lithium ion secondary battery is included in secondary batteries in which lithium ions contribute to electric conduction between electrodes in a charge/discharge reaction. Such a lithium ion secondary battery has characteristics of higher energy density and a smaller memory effect than other secondary batteries such as a nickel-hydrogen battery and a nickel-cadmium battery.

Hereby, application of the lithium ion secondary battery is growing to a variety of fields from a small size power supply used for portable electronics and electric home appliances up to middle and large size power supplies such as a stationary power supply used for power storage facility, an uninterruptible power supply system and a power leveling device, and a driving power supply used for a ship, a train, a hybrid train, a hybrid vehicle and an electric vehicle.

When the lithium ion secondary battery is used for middle and large size power supplies, especially demanded is highly improved energy density of battery. Realizing such highly improved energy density of battery needs a cathode and an anode both having highly improved energy density, and therefore demands an active substance having a highly improved capacity to be used for a cathode and an anode.

A cathode active substance having a high charge/discharge capacity is known as a powdery lithium composite compound represented by $LiM^1O_2$ (where $M^1$ is an element such as Ni, Co and Mn or the like) having an $\alpha$-$NaFeO_2$ layered structure. This cathode active substance tends to show an increase in the capacity, especially as the nickel content is increased. Thus, a so called high-nickel cathode active substance having a high nickel content ratio is expected to be a promising candidate for realizing an improved energy density of battery.

A technology described in Patent Document 1 is known relevant to a high-nickel cathode active substance. A cathode active substance used for a lithium ion battery described in Patent Document 1 has a layered structure represented by the composition formula: $Li_x(Ni_yM_{1-y})O_z$ (where M is Mn or Co; $0.9 \leq x \leq 1.2$; $0.6 \leq y \leq 0.9$; and $1.8 \leq z \leq 2.4$).

Herein, when an average secondary particle size of the powdery cathode active substance is represented by D50 and an average secondary particle size of the powdery cathode active substance thus pressed at 100 MPa is represented by D50P, a particle size ratio (D50P/D50) is 0.6 or more. Further, particles having a particle size of 0.4 μm or less with respect to the powdery cathode active substance thus pressed at 100 MPa are included at a volume ratio of 3% or less per entire particles.

DOCUMENTS OF PRIOR ART

Patent Documents

Patent Document 1: WO2011/108398 (i.e., international patent publication corresponding to Japanese Patent Publication No. 5313392)

SUMMARY OF INVENTION

Problems to be Solved by Invention

Here, Patent Document 1 discloses a technology by which a lithium ion secondary battery having a high rate property is provided via focusing on strength of secondary particles of a cathode active substance (see for example, paragraph 0007 in the specification).

However, it should be noted that there are a variety of battery properties. Thus, merely the technology disclosed in Patent Document 1 may fail to improve battery properties other than the rate property.

Further, there is a phenomenon that an internal resistance of the secondary battery increases associated with charge/discharge cycles. Investigation on the above phenomenon by the present inventors has revealed that the increase in the resistance caused following the charge/discharge cycles is related to an easiness of forming a contact surface of primary particles with an electrolyte solution, instead of the strength to reach crushing such as crushing strength and particle strength. A surface of primary particles located at an outer side of a secondary particle is a contact surface to an electrolyte solution. On the contact surface, Li deficiency is caused associated with the charge/discharge cycles. Hence, the Li deficiency on the surface of the primary particles influences the internal resistance of the secondary battery.

Accordingly, stress thus caused following the charge/discharge cycles increases a total area of the contact surface between the surface of the primary particles and the electrolyte solution. The increase in the total area of the contact surface increases an area where the Li deficiency may be increased, resulting in a defect to accelerate the increase in the internal resistance.

The present invention has been developed in view of the above described defect. Therefore, the present invention is directed to providing a cathode active substance used for a lithium ion secondary battery capable of suppressing an increase in the internal resistance in the battery thus caused associated with charge/discharge cycles, a cathode including the cathode active substance, and a lithium ion secondary battery provided with the cathode.

Means for Solving Problems

The present inventors have keenly investigated to solve the above described defect. As a result, the inventors have obtained the following findings and completed the present invention. Namely, a key aspect of the present invention is a cathode active substance used for a lithium ion secondary battery including a lithium composite compound represented by the following formula (1).

$$Li_{1+\alpha}Ni_xCo_yM^1{}_{1-x-y-z}M^2{}_zO_{2+\beta} \qquad \text{Formula (1)}$$

In the formula (1), "$\alpha$", "$\beta$", "$x$", "$y$" and "$z$" are respectively numbers satisfying the following relationships: $-0.03 \leq \alpha \leq 0.08$, $-0.2 \leq \beta \leq 0.2$, $0.7 \leq x \leq 0.9$, $0.03 \leq y \leq 0.3$, $0 \leq z \leq 0.1$. $M^1$ is at least an element selected from Mn and Al, $M^2$ is at least an element selected from Mg, Ti, Zr, Mo and Nb.

Here, Pi is defined as porosity with respect to an opening diameter of 0.6 μm or less thus measured by a mercury press-in method, and Pp is defined as porosity with respect to an opening diameter of 0.6 μm or less thus measured by a mercury press-in method after the compound is filled in a mold having an internal diameter of 10 mm and pressed by a load of 40 MPa. Under the above definition, the lithium composite compound has a feature that a value of Pp/Pi is 1.5 or less. Herein, other means to address the above defect will be described later in the embodiments for carrying out the invention.

Effect of Invention

According to the present invention, provided are a cathode active substance used for a lithium ion secondary battery, which is capable of suppressing an increase in the internal resistance in a battery caused following charge/discharge cycles, a cathode including the cathode active substance, and a lithium ion secondary battery provided with the cathode.

BRIEF DESCRIPTION OF DRAWINGS

FIG. 1A shows a state of the cathode active substance at the initial state (i.e., before charge/discharge operation).

FIG. 1B shows a state of the cathode active substance after charge/discharge operation. FIG. 1C is a schematic cross-sectional diagram of the cathode active substance when it is pressed to measure the porosity.

EMBODIMENTS FOR CARRYING OUT INVENTION

Figure 1A:
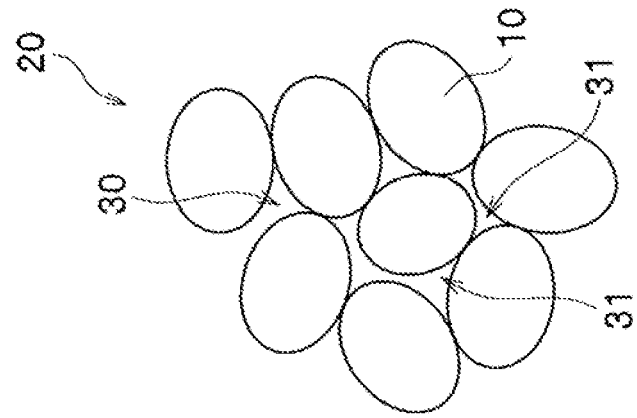
FIGS. 1A-1C are diagrams each showing an opening pore and a closed pore in a cathode active substance of the present embodiment.

Hereinafter, embodiments for carrying out of the present invention will be described appropriately referring to attached drawings. Note, the drawings to be referred are merely shown in a schematic manner, and the shapes therein may be different from the actual ones. Further, in the following descriptions, the phrases of "more than (numeral value)" and "less than (numeral value)" mean that the numeral value is not included in the range. In contrast, the phrases of "(numeral value) or more" and "(numeral value) or less" mean that the numeral value is included in the range.

[1. Cathode Active Substance]

A cathode active substance according to the present embodiment is used for a cathode of a lithium ion secondary battery. More specifically, the cathode is obtained by covering a metal sheet with a cathode mixture including a cathode active substance and optionally including a binder together with a conductive material, and drying the covered sheet.

<Composition>

The cathode active substance of the present embodiment includes a lithium composite compound represented by the following formula (1).

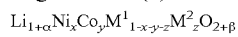  Formula (1)

In the formula (1), "α", "β", "x", "y" and "z" are respectively numbers satisfying the following relationships: $-0.03 \leq \alpha \leq 0.08$, $-0.2 \leq \beta \leq 0.2$, $0.7 \leq x \leq 0.9$, $0.03 \leq y \leq 0.3$, $0 \leq z \leq 0.1$. $M^1$ is at least one element selected from Mn and Al, and $M^2$ is at least one element selected from Mg, Ti, Zr, Mo and Nb.

The cathode active substance formed including the lithium composite compound represented by Formula (1) is capable of repeating reversible intercalation/de-intercalation of lithium ions associated with the charge/discharge operation. Further, the cathode active substance has an α-NaFeO$_2$ layered structure with low resistance.

Moreover, in the cathode active substance of the present embodiment, the lithium composite compound represented by Formula (1) is typically included as primary particles. The cathode active substance of the present embodiment is formed of secondary particles made by agglomeration of the plurality of primary particles. However, particles of the lithium composite compound forming the cathode active substance may be primary particles each of which is formed separately. Alternatively, the particle of the lithium composite compound may be secondary particles formed by bonding the plurality of primary particles via firing, or primary particles or secondary particles containing a free lithium compound.

In Formula (1), "a" represents an excess or a deficiency relative to the stoichiometric ratio of the cathode active substance represented by the general formula: LiM$^1$O$_2$, that is, an excess or a deficiency amount of Li relative to the ratio of Li:M$^1$:O=1:1:2. Here, M$^1$ represents a metal element other than Li in Formula (1). The higher a content of Li becomes, the higher a valence of the transition metal before charge becomes. Hence, this phenomenon decreases a degree of valence change in the transition metal when Li is de-intercalated, leading to an improvement in charge/discharge cycle performance of the cathode active substance. On the other hand, an excess content of Li decreases a charge/discharge capacity of the cathode active substance.

Accordingly, prescribing the range of "α" that represents a content of Li in Formula (1) to be −0.03 or more and 0.08 or less may increase the cycle property of the cathode active substance, and further suppress a decrease in the charge/discharge capacity.

A range of "α" may be preferably set to 0 or more and 0.05 or less. When "α" is 0 or more in Formula (1), a sufficient amount of Li contributed to charge/discharge operation is secured, which enables aiming for a more highly increased capacity of the cathode active substance. Alternatively, when "α" is 0.05 or less in Formula (1), charge compensation can be sufficiently achieved via the valence change of the transition metal. This can realize a high capacity as well as a high cycle property of the cathode active substance.

Further, in Formula (1), "x" represents a content of Ni. When "x" is larger than 0.7, a sufficient amount of Li contributed to charge/discharge operation in the cathode active substance is secured, which enables aiming for a highly improved capacity. On the other hand, when "x" is larger than 0.9 in Formula (1), a part of Ni is replaced to a Li site, failing to secure a sufficient amount of Li contributed to the charge/discharge operation. This may decrease a charge/discharge capacity of the cathode active substance. Accordingly, prescribing the range of "x" which represents a content of Ni in Formula (1) to be larger than 0.7 and 0.9 or less, more preferably, larger than 0.75 and 0.85 or less can realize a highly improved capacity of the cathode active substance as well as suppression of a decreases in the charge/discharge capacity.

In Formula (1), "y" represents a content of Co. When "y" is 0.03 or more, a layered structure of the cathode active substance can be stably held. The layered structure thus stably held can suppress cation mixing that is a phenomenon where Ni is mixed in the Li site, allowing achievement of the excellent cycle property. On the other hand, when "y" is larger than 0.3 in Formula (1), a content of Co having limited supply and a high cost is relatively increased, leading to a disadvantage when the cathode active substance is industrially produced. Accordingly, prescribing the range of "y" that represents a content of Co in Formula (1) to be 0.03 or more and 0.3 or less, more preferably larger than 0.05 and 0.2 or less can improve the cycle property, leading to an advantage when the cathode active substance is industrially produced.

In Formula (1), "z" represents a content of $M^2$. "z" is set to 0 or more and 0.1 or less, more preferably 0.005 or more and 0.1 or less. When "z" is in the above range, a decrease in the capacity of the cathode active substance can be suppressed.

In Formula (1), $M^1$ is at least one or more types of elements selected from Mn and Al. Those elements have an effect of stably holding a layered structure even when Li is de-intercalated by charge operation. Among those elements, preferable $M^1$ is Mn because Mn can more stably hold a layered structure even when Li is de-intercalated by charge operation, and therefore realize a higher capacity. Note, a value of "1-x-y-z" that represents a content of $M^1$ is preferably set to 0.35 or less from the viewpoint of sufficiently securing the capacity of the cathode active substance.

Further, in Formula (1), $M^2$ is at least one type of elements selected from Mg, Ti, Zr, Mo and Nb. When $M^2$ is selected from those elements, an electrochemical activity of the cathode active substance can be secured. Moreover, those metal elements are strongly bound to oxygen. Thus, replacing the metal site of the cathode active substance by those metal elements can improve a stability of the crystal structure of the cathode active substance and electrochemical properties (i.e., cycle property or the like) of the secondary battery using the layered cathode active substance.

Furthermore, preferable $M^2$ is Ti. Ti has an effect of stabilizing a skeleton of the crustal structure, which sufficiently prevents crystal distortion during the charge/discharge operation associated with the intercalation/de-intercalation of Li. This effect can sufficiently prevent the above described cation mixing. Further, this effect can sufficiently suppress decomposition of the crystal in association with the charge/discharge cycles, allowing suppression of a heterogeneous phase like NiO from being formed.

A value of "z" is set to 0 or more and 0.1 or less. Here, when Ti is used as $M^2$, preferably "z" is set to 0.001 or more and 0.05 or less. When "z" is 0.001 or more, addition of Ti can surely exert the effect of Ti as mentioned above. On the other hand, when "z" is set to 0.1 or less, a decrease in the electric capacity of the cathode active substance can be prevented.

Further, in Formula (1), "1" represents an excess or deficient amount of oxygen. Preferably, "β" is set in the range that allows a layered structure compound assigned to a space group R-3m. Specifically, in view of holding the α-NaFO$_2$ layered structure of the cathode active substance, "β" is set in the range of −0.2 or more and 0.2 or less. Further, in view of more surely holding the layered crystal structure of the cathode active substance, preferably "β" is set in the range of −0.1 or more and 0.1 or less.

Note, an average composition of each element as described above can be checked by an inductively coupled plasma (ICP) analysis, and an atomic adsorption spectrometry (AAS) analysis or the like.

<Physical Properties>
(Porosity)

The cathode active substance of the present embodiment is specified by porosity to be measured by a mercury press-in method. Specifically, a ratio between a predetermined value of porosity of the cathode active substance to be measured by a mercury press-in method and a predetermined value of porosity of the cathode active substance to be measured after filled in a mold having an inner diameter of 10 mm and pressed at 40 MPa is set to be a predetermined value or less. Preferably, the relationship of the ratio is satisfied in the cathode active substance in the initial state (i.e., before charge/discharge operation of the lithium ion secondary battery including the cathode active substance). If more specifically describing the relationship, porosity with respect to an opening diameter of 0.6 μm or less measured by a mercury press-in method is defined as Pi, and porosity with respect to an opening diameter of 0.6 μm or less after the substance being pressed at 40 MPa and measured by a mercury press-in method is defined as Pp. Under this definition, a value of Pp/Pi becomes 1.5 or less. Next, this relationship will be described below in detail referring to FIGS. 1A-1C.

Figure 1B:
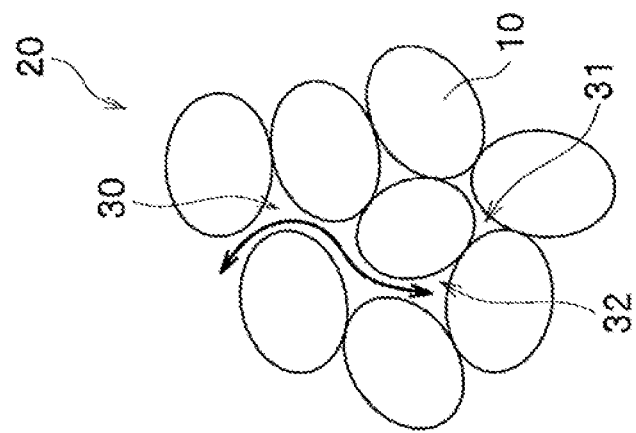
Figure 1C:
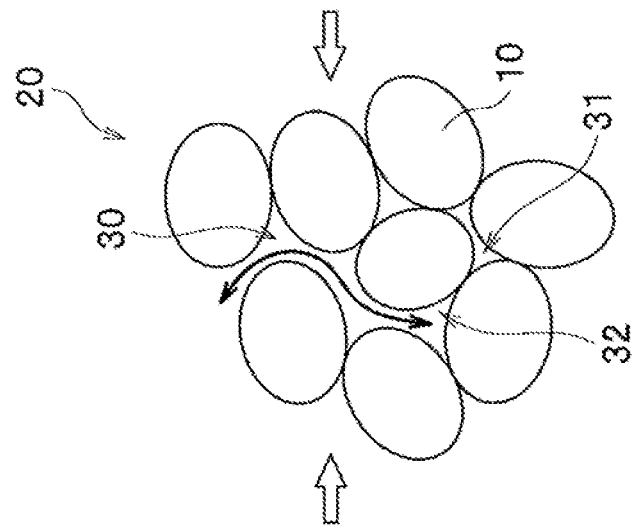

FIGS. 1A-1C are diagrams showing an opening pore and a closed pore in the cathode active substance of the present embodiment. FIG. 1A shows a state of the cathode active substance in the initial state (i.e., before charge/discharge operation). FIG. 1B shows a state of the cathode active substance after charge/discharge operation. FIG. 1C is a schematic diagram showing a pressed state of the cathode active substance when porosity is measured.

In FIGS. 1A-1C, primary particles 10 represent the above described compound (1), a secondary particle 20 represents a particle formed via agglomeration of a lot of the primary particles 10. Note, only 2 types of secondary particles 20 are shown in FIGS. 1A-1C. However, the cathode active substance of the present embodiment is actually formed including a plurality of secondary particles 20. Further, in the cathode of the lithium ion secondary battery, typically, the above described compound (1) is supported on a surface of the metal sheet (i.e., current collector, not shown) in a form of secondary particles 20 as shown in FIGS. 1A-1C.

A method for producing the cathode active substance of the present embodiment will be described in detail hereinafter. However, when a secondary particle 20 formed via agglomeration of many primary particles 10, for example, through firing of raw material mixture is obtained, pores are formed among the agglomerated primary particles 10 as shown in FIG. 1A. Herein, a gap is present between the primary particles 10 although the gap is surrounded by the primary particles 10. Therefore, there is a pore communicating to the outside of the secondary particles via the gap among those pores. Such a pore is referred to as opening pore 30 in the specification.

In contrast, there is a pore surrounded by the primary particles 10 and not communicating to the outside of the secondary particles 20 because no gap is present between the surrounded primary particles 10. Such a pore is referred to as a closed pore 31 in the specification.

Further, the primary particles 10 adjacent to each other are in contact as shown in FIG. 1A. Those primary particles 10 may be bonded each other, or simply in contact to each other. When the primary particles 10 are in contact to each other, especially if the primary particles 10 expand and contract following the charge/discharge cycles, the contact may be released. Then, when the contact is released, a gap is formed at the contacting part. The gap becomes a path between the closed pore 31 and the outside of the secondary particles 20. The formation of the gap converts the closed pore 31 to the opening pore. In this regards, the opening pore thus converted from the closed pore 31 is referred to as an opening pore 32 in order to distinguish it from the originally located opening pore 30.

Next, when charge/discharge operation is carried out from the initial state as shown in FIG. 1A, a particle boundary between the primary particles 10 becomes separated as mentioned above. This phenomenon occurs associated with intercalation/de-intercalation of lithium ions. Note, a degree of the deformation is smaller than the level that a bond between the adjacent primary particles 10 is cleaved to let the particles 10 come apart. Therefore, if separation of the particle boundary between the primary particles 10 occurs, a new opening pore 32 to be a path to the outside of the secondary particle 20 is formed in a part of the closed pore 31 as described above via expansion/contraction of the primary particles 10. Here, the path is shown by a solid line in FIG. 1B and FIG. 1C to be described later. The newly formed opening pore 32 is formed thus converted from the closed pore 31 as described hereinbefore. That is, the opening pore 32 may be equal to the closed pore 31 that changes a form to have an opening.

Note, the opening pore 30 present shown in the initial state (see FIG. 1A) has an extremely small possibility that the opening pore 30 shrinks or is eliminated by expansion/contraction of the primary particles. The reason is that bonding of the particle boundary does not proceed by the expansion/contraction. Therefore, change from the state shown in FIG. 1A to the state shown in FIG. 1B in association with the charge/discharge cycles, results in an increase in an opening ratio of the entire cathode active substance.

Here, investigation of the present inventors revealed that an increase in the resistance inside the battery occurring in association with the charge/discharge cycles was caused by the opening pores 30 and 32. That is, Li deficient occurs associated with the charge/discharge cycles on a surface of the primary particles 10 located at the exterior of the secondary particle 20, the exterior being a contact surface between the cathode active substance and the non-aqueous electrolyte solution (not shown), which results in an increase in the resistance in battery.

Accordingly, a stress following the charge/discharge cycles dissociates the particle boundaries of the primary particles 10 to make the non-aqueous electrolyte solution contact with the boundaries so that the resistance is increased. Further, conversion from the closed pore 31 to the opening pore 32 increases a contact area with the non-aqueous electrolyte solution. Those phenomena increase a Li deficient area thus remarkably generated, which accelerates an increase in the resistance in battery.

As a result, the present inventors have found out that the increase in the resistance caused following the charge/discharge cycles has a relationship with a possibility of forming a contact surface with the non-aqueous electrolyte solution, instead of strength to reach crushing (i.e., crushing strength and particle strength). In other words, even a secondary battery conventionally determined to have excellent battery properties due to the high crushing strength may have low cycle properties, if the deformation is so large and the contact area with the non-aqueous electrolyte solution is very large, even although the deformation does not reach crushing.

On the contrary, even a secondary battery conventionally determined to have poor battery properties due to the low crushing strength may have excellent cycle properties, if the deformation is small although the crushing relatively tends to occur and the contact area with the non-aqueous electrolyte solution is small.

Further, a possibility of generating a contact surface with the non-aqueous electrolyte solution is considered to be mainly caused by a size of the opening pore 32 thus newly formed following the charge/discharge cycles because the size of the opening pore 30 located in the initial state is hardly changed as mentioned above. That is, when the opening pore 32 is newly formed in many numbers, this increases the contact area with the non-aqueous electrolyte solution, thereby to facilitate the increase in the battery resistance (i.e., "internal resistance of secondary battery", the same hereinafter).

On the contrary, when the opening pore 32 is newly formed in a few numbers, this keeps the contact area with the non-aqueous electrolyte solution small, thereby to suppress the increase in the battery resistance.

However, the number and the size of the closed pores 31 present in the initial state are difficulty estimated by using a mercury press-in method because the closed pore 31 is not opened. Therefore, the cathode active substance is pressed at 40 MPa (see in the directions of open arrows in FIG. 1C). Herein, the pressure has enough strength to distort the closed pore 31 to be opened thereby being converted to an opening pore 32. Then, the resulting cathode active substance thus pressed is evaluated on the porosity thereof. Thus, the cathode active substances of the present embodiment are specified by using the evaluated porosity.

Namely, preferably in the initial state, porosity with respect to an opening diameter of 0.6 μm or less measured by a mercury press-in method is defined as Pi, and porosity with respect to an opening diameter of 0.6 μm or less measured by a mercury press-in method after the cathode active substance is filled in a mold having an inner diameter of 10 mm and pressed at 40 MPa is defined as Pp. In the above definition, a value of Pp/Pi, which shows a degree how many opening pores 32 thus converted from the closed pores 31 are present, is 1.5 or less. Herein, a reason for setting the opening diameter to 0.6 μm is because many times a pore size (i.e., diameter) generated between the primary particles 10 is 0.6 μm or less. In other words, many times a pore having a diameter larger than 0.6 μm is a pore generated between the secondary particles 20. Note, although a lower limit of the pore size (i.e., diameter) is not specially defined, typically the lower limit is 0.003 μm because a detection limit in a mercury press-in method has a value of 0.003 μm.

As mentioned above, the primary particles 10 are deformed following the charge/discharge cycles, and each volume thereof is also changed. This change applies stress to the primary particles 10 every cycle. Here, a small increase in the number of the opening pores 32 when the stress is applied thereto by pressing means that an increase in the contact area with the non-aqueous electrolyte solution is small due to strong adhesiveness of the particle boundaries between the primary particles 10 and few separation of particle boundaries thereof possibly occurring associated with the charge/discharge cycles. This observation indicates few increases in the contact area with the non-aqueous electrolyte solution. Accordingly, a design of a cathode active substance based on the above indications may suppress the increase in the resistance following the charge/discharge cycles and simultaneously improve the cycle properties.

Further, it is preferable to set the porosity Pi with respect to an opening diameter of 0.6 μm or less into 30% or less that is measured by a mercury press-in method in the initial state (i.e., before charge/discharge operation). The porosity Pi of 30% or less may decrease the contact area with the non-aqueous electrolyte solution thereby to sufficiently suppress an increase in the resistance caused following the charge/discharge cycles. Preferably, the porosity Pi is especially set to 15% or less. the porosity Pi of 15% or less may further decrease the contact area with the non-aqueous electrolyte solution, thereby to further suppress the increase in the resistance possibly caused following the charge/discharge cycles.

Further, it is preferable to set the porosity Pp with respect to an opening diameter of 0.6 μm or less into 20% or less that is measured by a mercury press-in method after the cathode active substance is pressed at 40 MPa. The porosity Pp of 20% or less may suppress an increase in the number of the opening pores 32 caused following the charge/discharge cycles, thereby to further suppress an increase in the resistance.

Here, the porosity in the mercury press-in method can be measured, for example, by using a measurement apparatus described in Examples (e.g., mercury porosimeter). Further, a cathode active substance can be filled in a metal mold having an internal diameter of 10 mm (e.g., circular metal mold with an internal diameter of 10 mm) to be used when pressed at 40 MPa by using the amount to cover a bottom surface inside the metal mold (e.g., about 0.1 g to 0.5 g). Then, the metal mold thus filled with the cathode active substance is pressed from the upper side by a load of 40 MPa using a press machine.

(Strength)

The cathode active substance of the present embodiment is pressed at 40 MPa thus filled in a mold with an internal diameter of 10 mm as described above. Here, a pressing pressure (i.e., 40 MPa) is different from crushing strength (i.e., particle fracture strength). That is, the pressing pressure is pressed onto the entire secondary particles contained in the cathode active substance filled in a mold with an internal diameter of 10 mm. However, the particle fraction strength is directly loaded onto the respective secondary particles using a probe etc. Therefore, there is not relationship between a value of Pp/Pi and particle fracture strength.

The particle fracture strength of the cathode active substance in the present embodiment is preferably 10 MPa or more and 200 MPa or less. The above range of the particle fracture strength can suppress destruction of the secondary particles of the cathode active substance during the production of electrode. Further, when a cathode mixture layer is prepared by coating a surface of a cathode current collector with slurry containing the cathode active substance, a coating defect such as peeling can be prevented. The particle fracture strength of the cathode active substance can be measured, for example, by using a microcompression testing machine.

(Size of Primary Particle)

An average particle size of the primary particles contained in the cathode active substance of the present embodiment is preferably 0.1 μm or more and 2 μm or less. This range of the average particle size of the primary particles can improve a filling property of the cathode active substance in the cathode, thereby to produce a cathode having a high energy density when a cathode including the cathode active substance is produced. Note, an average particle size of the primary particles can be determined by analyzing the primary particles by scanning electron microscopy (SEM) or transmission electron microscopy (TEM), and calculating an average value of the measured particle sizes.

(Size of Secondary Particle)

A particle size of the secondary particles contained in the cathode active substance of the present embodiment is preferably 3 μm or more and 50 μm or less. 3 μm or more of the average particle size of the secondary particles in the cathode active substance can improve a filling property of the cathode active substance in the cathode, thereby to produce a cathode having a high density. Further, 50 μm or less of the average particle size of the secondary particles in the cathode active substance has an advantage for smoothly producing a cathode. Note, an average particle size of the secondary particles can be determined by analyzing the secondary particles by laser diffraction particle size analyzer.

(Atomic Ratio of $Ti^{3+}/Ti^{4+}$) When Ti is included in the cathode active substance of the present embodiment, that is, when Ti is included as $M^2$ in the above Formula (1), an atomic ratio of $Ti^{3+}$ to $Ti^{4+}$ ($Ti^{3+}/Ti^{4+}$) is preferably 1.5 or more and 20 or less based on X-ray photoelectron spectroscopic analysis (XPS). This range of the atomic ratio can prevent an increase in the resistance following charge/discharge cycles. Note, the atomic ratio can be measured, for example, by using the devices described in Examples as mentioned hereinafter.

(Specific Surface Area)

A BET specific surface area of the cathode active substance is preferably set to about 0.1 $m^2/g$ or more and about 2.0 $m^2/g$ or less. This range of the BET specific surface area can improve a filling property of the cathode active substance in a cathode, thereby to produce a cathode having a high energy density. Note, a BET specific surface area can be measured by, for example, an automatic specific surface area analyzer.

[2. Method for Producing Cathode Active Substance]

A cathode active substance may be produced by any method. For example, primary particles of the cathode active substance are granulated by a dry-granulator a wet-granulator to form secondary particles, thereby to produce the cathode active substance containing secondary particles.

Hereinafter, more specifically a method for producing a cathode active substance will be described in detail.

Figure 2:
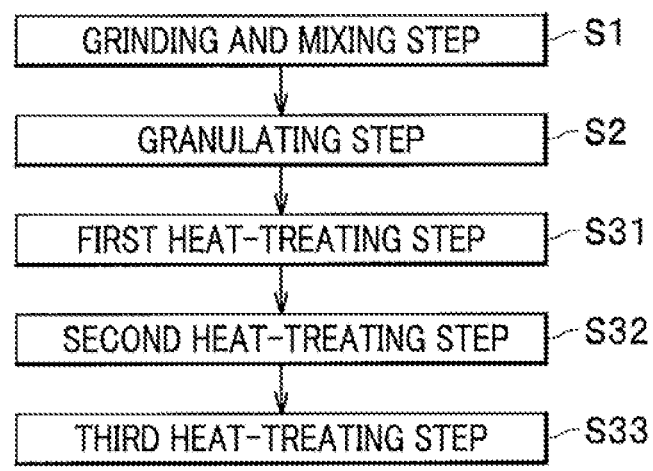
FIG. 2 is a flowchart showing a method for producing a cathode active substance of the present embodiment.

FIG. 2 is a flowchart showing a method for producing a cathode active substance of the present embodiment. As shown in FIG. 2, the cathode active substance of the present embodiment can be produced by a method including a grinding and mixing step S1, a granulating step S2, a first heat-treating step S31, a second heat-treating step S32, and a third heat-treating step S33. Among those steps, heat-treatment is conducted in the first heat-treating step S31, the second heat-treating step S32, and the third heat-treating step S33. However, the heat-treatment is not limited to the above described three stages of heat-treatment. Next, a method for producing a cathode active substance of the present embodiment will be described referring to the respective steps.

(Grinding and Mixing Step S1)

The grinding and mixing step S1 is performed by grinding and mixing a starting material including lithium carbonate at 80 mass % or more, to prepare a mixture. As for a starting material including a metal element (i.e., Ni, Co, $M^1$ and $M^2$)

other than Li in the above described Formula (1), appropriately selected is a compound formed of a carbonate, a hydroxide, an oxyhydroxide, an acetate, a citrate, an oxide, etc. of the above metal element together with C, H, 0 and N. Here, a carbonate and a hydroxide are especially desirable in view of an easy grinding property thereof and a gas releasing amount thus generated after decomposed by heat.

In the grinding and mixing step S1, starting materials thus weighed are mixed at a ratio to give a predetermined element composition corresponding to Formula (1), so as to prepare a raw material powder. Herein, the term of "starting materials" as mentioned above includes a Ni-containing compound, a Co-containing compound, an $M^1$-containing compound and an $M^2$-containing compound, besides a Li-containing compound. In the method for producing a cathode active substance of the present embodiment, lithium carbonate is used as a Li-containing compound. Here, lithium carbonate is more desirable in the supply stability, low cost and weak alkaline properties than other Li-containing compounds such as lithium acetate, lithium nitrate, lithium hydroxide, lithium chloride, and lithium sulfate, etc. Those desirable properties of lithium carbonate suppress damage of a production device, allowing excellent industrial usability and practical use thereof.

Here, as for a Ni-containing compound, a Co-containing compound, an $M^1$-containing compound and an $M^2$-containing compound, preferably used are, for example, an oxide, a hydroxide, a carbonate, a sulfate, or an acetate of Ni, Co, $M^1$ and $M^2$; more preferably especially an oxide, an hydroxide or a carbonate thereof. Further, as for an $M^2$-containing compound, used are, for example, an acetate, a nitrate, a carbonate, a sulfate, an oxide and a hydroxide of $M^2$, more preferably especially a carbonate, an oxide and a hydroxide thereof.

In the grinding and mixing step S1, preferably the starting materials are ground by, for example, a grinder, and then mixed together. The procedure can prepare a powdery solid mixture thus uniformly mixed. As a grinder that grinds compounds of the starting materials, used are fine grinders such as a boll-mill, a jet-mill, a rod-mill, and a sand-mill. Herein, used are both methods including a wet-milling process of grinding the materials in a liquid like water, and a dry-milling method of using no liquid. In view of preparing a grinding and mixing powder having a small particle size, a wet-milling process is more desirable. Namely, in the grinding and mixing step S1, it is preferable to make the resultant mixture to a slurry thereof by a wet-milling process.

(Granulating Step S2)

A granulating step S2 is performed by spraying a mixture thus made as a slurry in the grinding and mixing step S1 through a nozzle to be dried, thereby to granulate a precursor of the compound (1) (hereinafter, simply referring to as a "precursor"). It is preferable to use a spray-dry method. In the spray method, used are a binary fluid nozzle, a tetranary fluid nozzle, a disk type, a spray-dryer and a tumbling fluidized bed device or the like. Use of the spray-dry method and control of a spray amount and a slurry concentration can control porosity of the compound (1). For example, increases in the spray amount and the slurry concentration can decrease the porosity of the compound (1). As for specific conditions to use the spray-dry method, conditions described in Examples as mentioned hereinafter can be applicable thereto.

(First Heat-Treating Step: S31)

In a first heat-treating step S31, the second heat-treating step S32 and the third heat-treating step S33 as mentioned hereinafter, the compound (1) can be produced by firing the precursor thus obtained in the granulating step S2. Next, the respective steps will be described more specifically.

In the first heat-treating step S31, a first precursor is produced by heat-treating the precursor at a heat-treating temperature of 200° C. or more and 400° C. or less, and for a time of 0.5 hr or more and 5 hr or less. The first heat-treating step S31 is performed mainly for the purpose of removing vaporized components such as water that prevents a synthetic reaction of the cathode active substance. In short, the first heat-treating step S31 is a heat-treating step of removing water contained in the mixture.

In the first heat-treating step S31, vaporized components thus included in the mixture to be heat-treated, for example, water, impurities and volatile components formed following heat decomposition are vaporized, burned and volatilized, thereby to generate gas. Further, in the first heat-treating step S31, the mixture to be heat-treated contains carbonates such as lithium carbonate. Hereby, carbon dioxide gas is generated following the heat decomposition of the carbonates.

Here, in the first heat-treating step S31, a heat-treating temperature less than 200° C. may fail a sufficient combustion reaction of impurities and a heat decomposition reaction of the starting materials. Further, in the first heat-treating step S31, a heat-treating temperature more than 400° C. may form a layered structure of the compound (1) under an atmosphere containing the gas generated from the mixture during the heat treatment. Accordingly, the heat treatment of the mixture at the heat-treating temperature of 200° C. or more and 400° C. or less can sufficiently remove the vaporized components like water, and simultaneously produce the first precursor which has not formed any layered structure.

Further, in the first heat-treating step S31, the heat-treating temperature preferably in the range from 250° C. to 400° C., more preferably from 250° C. to 380° C. can more improve the removal effect of volatized components like water and the prevention effect of layered structure formation. Moreover, a heat-treating time in the first heat-treating step S31 may be appropriately varied corresponding to, for example, a heat-treating temperature, a removal degree of the vaporized components and a prevention degree of the layered structure formation.

Furthermore, in the first heat-treating step S31, preferably the heat treatment is carried out under a gas flow condition of an atmospheric gas or a pump exhaust condition for the purpose of exhausting gas thus generated from the mixture thus treated. Preferably, a flow rate per 1 min of the atmospheric gas or an exhausting volume per 1 min by a pump is larger than a volume of the gas generated from the mixture. Here, a volume of the gas generated from the mixture to be treated in the first heat-treating step S31 may be calculated, for example, based on a ratio between masses of the starting materials and the vaporized components included in the mixture.

Further, the first heat-treating step S31 may be carried out under a reduced pressure at the atmospheric pressure or less. Moreover, an oxidative atmosphere of the first heat-treating step S31 may be the atmosphere since the first heat-treating step S31 is not mainly directed to the oxidative reaction. Use of the atmosphere as the oxidative atmosphere in the first heat-treating step S31 may easily supply the atmosphere and improve the productivity of the cathode active substance, allowing a decrease in the production costs. Furthermore, a heat-treating atmosphere of the first heat-treating step S31 is not limited to an oxidative atmosphere. For example, a non-oxidative atmosphere like an inert gas may be used therefor.

(Second Heat-Treating Step: S32)

In a second heat-treating step S32 carried out following the first heat-treating step S31, the first precursor as described hereinbefore is heat-treated at a heat-treating temperature of 450° C. or more and 800° C. or less, and for a heat-treating time of 0.5 hr or more and 50 hr or less. Hereby, 93 mass % or more of lithium carbonate is made to react to produce a second precursor.

Here, the second heat-treating step S32 is carried out mainly for the purpose of converting lithium carbonate in the first precursor to lithium oxide and also removing carbonate components via synthesizing a compound having a layered structure represented by the composition formula of $LiM^1O_2$ through the reaction between lithium carbonate and transition metals (i.e., Ni, Co, $M^1$ and $M^2$). In short, the second heat-treating step S32 is a heat-treating step of removing carbonate components included in the first precursor.

Here, a heat-treating temperature less than 450° C. in the second heat-treating step S32 remarkably slows down a formation reaction of a layered structure when the second precursor having a layered structure is formed via heat-treating the first precursor, allowing lithium carbonate to tend to excessively remain. On the other hand, a heat-treating temperature more than 800° C. in the second heat-treating step S32 excessively facilitates growth of particles, thereby preventing formation of a cathode active substance with a high capacity. Further, a heat-treating temperature preferably at 600° C. or more in the second heat-treating step S32 can facilitate lithium carbonate to more actively react.

On the contrary, a heat-treating temperature at 700° C. or less in the second heat-treating step S32 can further improve a prevention effect of crystal particles glowing. Moreover, an increase in the heat-treating temperature and a decrease in an amount of lithium carbonate used for the second precursor in the second heat-treating step S32 can decrease the porosity Pi in the initial state. In contrast, a decrease in the heat-treating temperature and an increase in an amount of lithium carbonate in the second heat-treating step S32 can increase the porosity Pi in the initial state.

Further, a heat-treating time may be set to 0.5 hr or more and 50 hr or less so as to allow the first precursor to sufficiently react with oxygen in the range of the heat-treating temperature in the second heat-treating step S32. In view of improving the productivity, preferably a heat-treating time is set to 2 hr or more and 15 hr or less in the second heat-treating step S32.

(Third Heat-Treating Step: S33)

A third heat-treating step S33 subsequently conducted after the second heat-treating step S32 performs heat-treating the second precursor at a heat-treating temperature of more than 730° C. and 900° C. less, more preferably at a heat-treating temperature of more than 750° C. and 900° C. less. At that step, a heat-treating time is set to 0.5 hr or more and 50 hr or less, preferably 5 hr or more and 15 hr or less from the viewpoint of improving productivity of the cathode active substance. This heat-treatment produces the compound (1).

The compound (1) thus obtained in the third heat-treating step S33 is a cathode active substance of the present embodiment. The third heat-treating step S33 is carried out for the purpose of sufficiently facilitating a Ni oxidation reaction in which Ni in the second precursor thus obtained in the second heat-treating step S32 is oxidized from bivalent Ni to trivalent Ni. Further, the third heat-treating step S33 is carried out for the purpose of growing crystal particles so that the compound (1) obtained in the heat-treatment evolves electrode properties. In short, the third heat-treating step S33 is a heat-treating step of facilitating a Ni oxidation reaction in the second precursor and growth of crystal particles.

A heat-treating atmosphere in the third heat-treating step S33 is an oxidative atmosphere that contains oxygen in order to sufficiently proceed with a Ni oxidation reaction of the second precursor in the third heat-treating step S33. Herein, the oxidative atmosphere in the third heat-treating step S33 has preferably an oxygen concentration of 80% or more, more preferably 90% or more, further more preferably 95% or more, and the most preferably 100%. Note, it is preferable to allow another gas to flow during the firing step S3, from the viewpoint of exhausting gas generated from raw materials containing metal elements and lithium raw materials, thereby to supply a sufficient amount of oxygen to a ground mixing powder.

Note, when a heat-treating temperature in the finish treating step S33 becomes 730° C. or less, crystallization of the second precursor may be difficult to proceed. Further, the heat-treating temperature more than 900° C. cannot prevent decomposition of the layered structure of the second precursor, thereby to produce bivalent Ni, resulting in a decrease in the capacity of the compound (1) thus obtained.

Therefore, adjusting the heat-treating temperature in the third heat-treating step S33 at more than 730° C. and 900° C. or less can facilitate growth of particles of the second precursor and also prevent decomposition of the layered structure, enabling improvement of the capacity of the compound (1) thus obtained. Here, adjusting the heat-treating temperature in the third heat-treating step S33 at 840° C. or more and 890° C. or less can further improve the growing effect of the particles and the preventing effect of the decomposition of the layered structure.

Further, when an oxygen partial pressure is low in the third heat-treating step S33, it is preferable to heat the mixture to facilitate the Ni oxidation reaction. That is, when oxygen is insufficiently supplied to the second precursor in the third heat-treating step S33, it is preferable to increase the heat-treating temperature. However, it should be noted that the increase in the heat-treating temperature may cause decomposition of the layered structure in the compound (1) thus obtained. This defect may fail to afford a favorable electrode property of the cathode active substance. Accordingly, it is preferable to set the heat-treating time in the third heat-treating step S33 to 0.5 hr or more and 50 hr or less so as to sufficiently supply oxygen to the second precursor as mentioned above.

The compound (1) that works as a cathode active substance can be obtained through carrying out the respective steps as mentioned above. The compound (1) thus obtained may be ground where necessary. This grinding process can easily convert the compound (1) into a slurry form thereof, allowing a cathode to be easily produced via coating a metal sheet (or current collector) with the slurry.

[3. Lithium Ion Secondary Battery]

A lithium ion secondary battery (hereinafter, simply referring to as "secondary battery") of the present embodiment is configured including a cathode mixture in a slurry form thus prepared by converting the cathode active material and optionally a binder or the like into a slurry thereof, and a cathode that is produced by coating an electrode sheet with the resultant slurry of the cathode mixture and drying the coated sheet. Here, as long as the secondary battery of the present embodiment has a cathode material of the present embodiment, a configuration of the secondary battery is not specifically limited. For example, the following configurations may be adapted thereto.

Figure 3:
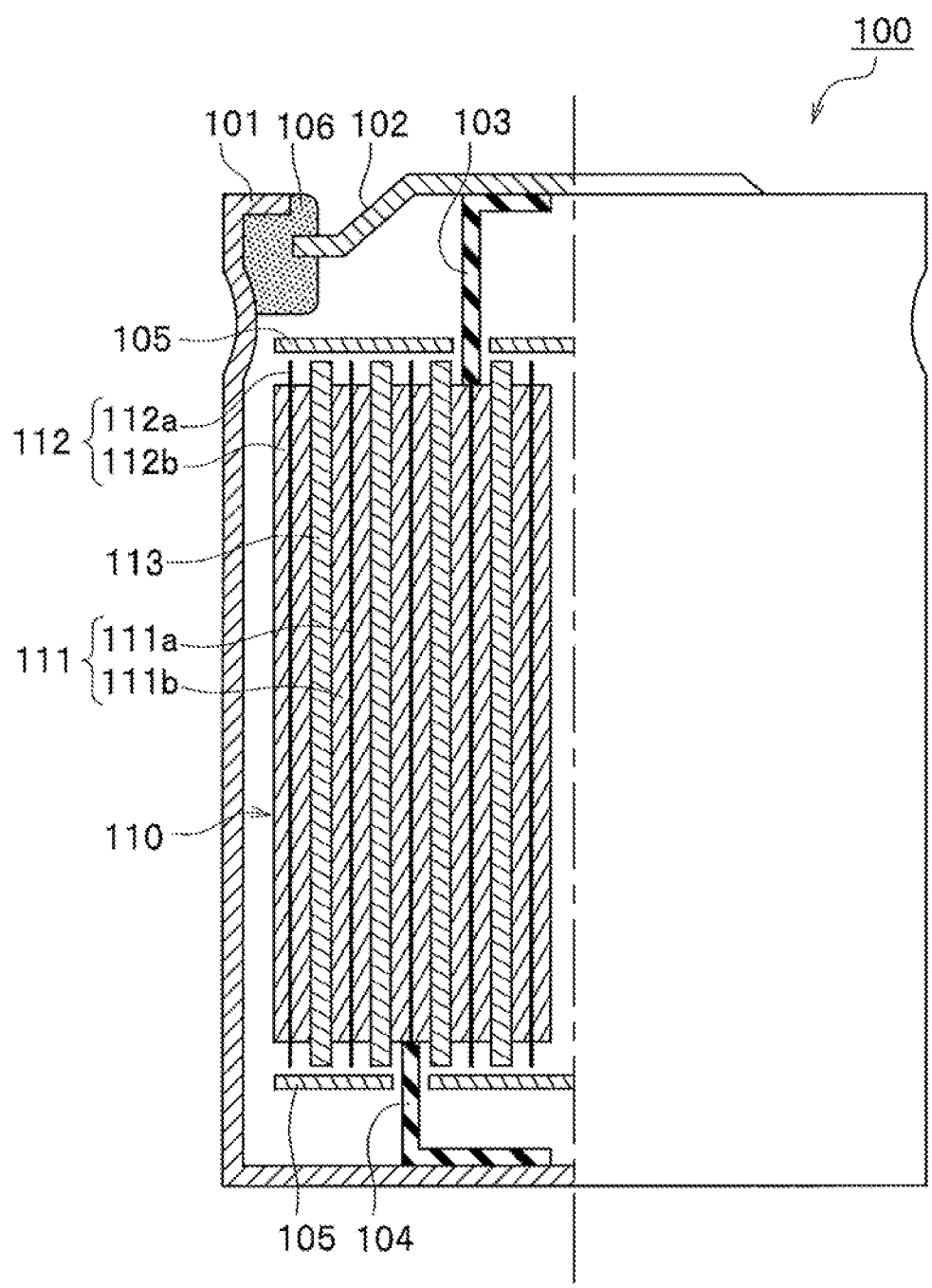
FIG. 3 is a schematic diagram showing a structure of a lithium ion secondary battery including a cathode active substance of the present embodiment.

FIG. 3 is a schematic diagram showing a structure of the lithium ion secondary battery having the cathode active substance of the present embodiment. In FIG. 3, a part of the internal structure of a secondary battery 100 is visually shown for convenience of explanation. The secondary battery 100 is a cylindrical lithium ion secondary battery, including a battery can 101 in a bottomed cylindrical shape that houses a non-aqueous electrolyte solution, a wound electrode group 110 housed in the battery can 101, and a battery lid 102 in a disc shape that seals an upper opening of the battery can 101. Note, the secondary battery 100 may have a button shape instead of a cylindrical shape.

The battery can 101 and the battery lid 102 are formed of a metallic material such as aluminum. Further, the battery lid 102 is fixed via caulking, etc. to the battery can 101 through a sealing material 106 made of a resin having an insulation property. This configuration allows the battery can 101 to be sealed by the battery lid 102, and simultaneously the can 101 and the lid 102 to be electrically insulated each other.

The wound electrode group 110 is configured by winding a cathode 111 and an anode both having a long strip shape and positioned opposite each other via inserting a separator 113 having a long strip shape around a winding center axis. In the wound electrode group 110, a cathode current collector 111a is electrically connected with the battery lid 102 via a cathode lead piece 103. Further, an anode current collector 112a is electrically connected with a bottom of the battery can 101 via an anode lead piece 104.

Both insulating sheets 105 that prevent a short-cut are arranged both between the wound electrode group 110 and the battery lid 102, and between the wound electrode group 110 and the battery can 101. The cathode lead piece 103 and the anode lead piece 104 are respectively members used for extracting a current and produced by using the same material as of the cathode current collector 111a and the anode current collector 112a. Further, the cathode lead piece 103 and the anode lead piece 104 are respectively joined to the cathode current collector 111a and the anode current collector 1112a via spot-welding or ultrasonic-welding or the like.

The cathode 111 is provided with the cathode current collector 111a formed of a metal sheet, and a cathode mixture layer 111b formed on a surface of the cathode current collector 111a. The cathode mixture layer 111b is formed including the cathode material. Further, the anode 112 is provided with the anode current collector 112a formed of a metal sheet, and an anode mixture layer 112b formed on a surface of the anode current collector 112a. The anode mixture layer 112b is formed including an optional anode mixture (e.g., carbon material) capable of being used for a lithium ion secondary battery.

As for a non-aqueous electrolyte solution capable of being used for the secondary battery 100, used is an optional non-aqueous electrolyte solution used for a lithium ion secondary battery. More specifically, usable is a non-aqueous electrolyte solution obtained by dissolving $LiPF_6$ in ethylene carbonate (EC).

EXAMPLES

Hereinafter, the present invention will be described more specifically referring to Examples.

Example 1

(Preparation of Cathode Active Substance) First, as for starting raw materials of the cathode active substance, prepared were lithium carbonate, nickel hydroxide, cobalt carbonate and manganese carbonate. Next, each of the starting raw materials were weighted so that the atomic ratio of Li:Ni:Co:Mn was set to 1.04:0.80:0.15:0.05. Then, the weighted respective raw materials were mixed, and sufficiently ground by using a ground mixing device, thereby to be subjected to wet-mixing to produce a slurry of raw materials (i.e., ground and mixing step S1). A concentration of the mixed raw material in the slurry was set to 20 mass %.

Next, a titanium-containing chelate agent (i.e., titanium lactate ammonium salt) was added to the slurry of raw material so that 1 mol of Ti was included per 100 mol of the total mol number of Ni, Co and Mn. Then, the mixture was sufficiently subjected to wet-mixing. The wet-mixing was carried out by using the same ground mixing device as described above. After that, the mixture thus subjected to the wet-mixing was spray-dried by a spray dryer, thereby to produce a powdery mixture (i.e., granulating step S2).

The mixture thus dried (300 g) was filled in an alumina vessel having a longitudinal length of 300 mm, a width of 300 mm and a height of 100 mm. The filled mixture was heat-treated by a continuous conveying furnace under the atmosphere at a heat-treating temperature of 350° C. for 1 hr (i.e., first heat-treating step S31). A resulting powder (or first precursor) thus obtained after the heat-treatment was heat-treated at a heat-treating temperature of 600° C. for 10 hr under an oxygen flow by the continuous conveying furnace of which atmosphere was replaced by an atmosphere having an oxygen concentration inside the furnace of 99% or more (i.e., second heat-treating step S32). This heat-treatment was also carried out by using the same device as in the first heat-treating step S31.

A resulting powder (or second precursor) thus obtained after the heat-treatment was heat-treated at a heat-treating temperature of 785° C. for 10 hr under an oxygen flow by the continuous conveying furnace of which atmosphere was replaced by an atmosphere having an oxygen concentration inside the furnace of 99% or more (i.e., third heat-treating step S33). This heat-treatment was also carried out by using the same device as in the first heat-treating step S31. Then, the resulting fired powder thus obtained after the heat-treatment was classified by using a sieve having an aperture of 53 μm or less. A resulting powder thus passed through the sieve was used for a cathode active substance (i.e., cathode active substance in Example 1).

Next, an element ratio of the obtained cathode active substance was analyzed by ICP. This analysis was performed by using OPTIMA 3300XL (PerkinElmer Co., Ltd). The result of the analysis showed that a composition ratio (mol ratio) of Li:Ni:Co:Mn:Ti was 1.02:0.79:0.15:0.05:0.01. As a result, it was determined that a composition formula of the obtained cathode active substance was $Li_{1.02}Ni_{0.79}Co_{0.15}Mn_{0.05}Ti_{0.01}O_2$. Further, although it is not shown, an X-ray diffraction measurement (RINT: Rigaku Corporation) of the obtained cathode active substance afforded a diffraction pattern corresponding to the α-$NaFeO_2$ layered structure.

Further, the obtained cathode active substance was analyzed by XPC to measure an atomic ratio of $Ti^{3+}$ per $Ti^{4+}$ (i.e., $Ti^{3+}/Ti^{4+}$). Here, PHI 50000 (ULVACK FINE Inc.) was used as a measurement device. Then, Ti2p spectra were measured by using the device. The spectra thus measured were subjected to spectrum-fitting of two spectra assigned to $Ti_2O_3(Ti^{3+})$ and $TiO_2$ ($Ti^{4+}$) respectively by using an analytical software of PHI MultiPak™ (ULVAK FINE Ltd.). Then, an area ratio of $Ti^+$ per $Ti^{4+}$ thus obtained was used as an atomic ratio of $Ti^{3+}$ per $Ti^{4+}$ with respect to $Ti^{3+}$ and $Ti^{4+}$ of cathode active substance in Example 1. As a result, the atomic ratio ($Ti^{3+}/Ti^{4+}$) was determined to be 1.9.

Moreover, the obtained cathode active substance was analyzed to measure a BET specific surface area by using BELSORP-mini (MicrotracBEL Corp.). As a result, the BET specific surface area was determined to be 1.3 $m^2/g$. Furthermore, the obtained cathode active substance was analyzed to measure the porosity Pi with respect to an opening diameter of 0.6 μm or less by using AutoPore (Shimazu Corporation) based on a mercury press-in method. As a result, the porosity Pi with respect to an opening diameter of 0.6 μm or less was determined to be 10%.

Further, the obtained cathode active substance was analyzed to measure the porosity Pp with respect to an opening diameter of 0.6 μm or less after being pressed at 40 MPa. More specifically, the porosity Pi was measured in the following procedure. First, the obtained cathode active substance (0.3 g) was filled in a mold having a circular inner space with a diameter of 10 mm. At that time, the cathode active substance was evenly filled without deviation as much as possible so that a bottom of the mold was invisibly covered. Then, the mold was pressed by a load of 40 MPa from the upper side, thereby giving a pellet with a diameter of 10 mm. Next, the obtained pellet was sufficiently ground by a pestle and mortar, to produce a powder. The resulting powder was analyzed to measure the porosity Pp similarly to the method used for the porosity Pi. As a result, the porosity Pp thus measured after the cathode active substance was pressed at 40 MPa was determined to be 9%. Accordingly, a value of Pp/Pi was 0.9.

Note, crushing strength of the obtained cathode active substance was measured for reference. As a measurement device, used was MCT-510 (Shimazu Corporation). As a result, the crushing strength was determined to be 67 MPa.

(Preparation of Lithium Ion Secondary Battery)

A lithium ion secondary battery (i.e., secondary battery in Example 1) was produced by using the obtained cathode active substance, and then the battery performance was evaluated.

First, the obtained cathode active substance, a binder and a conductive material were mixed. As for a binder, polyvinylidene fluoride was used. As for a conductive material, acetylene black was used. Then, those materials were sufficiently mixed to prepare a slurry of cathode mixture. At that time, N-methyl pyrrolidone was used as a solvent. Then, aluminum foil with a thickness of 20 μm working as a cathode current collector was coated with the slurry of cathode mixture thus prepared, and dried at 120° C. After that, the coated product was compression-molded by a press so that the electrode density was set to 2.6 $g/cm^3$. The pressed product was punched in a disc shape with a diameter of 15 mm to produce a cathode. Namely, 2.6 g of the cathode active substance is contained per 1 $cm^3$ of the cathode.

Next, as for an anode, metal lithium with the same size as of the cathode was used. Further, a non-aqueous electrolyte solution was prepared by dissolving $LiPF_6$ to a mixed solvent of ethylene carbonate and dimethyl carbonate at a volume rate of 3:7, thereby to have a $LiPF_6$ concentration of 1.0 mol/L. Then, a button type lithium ion secondary battery (i.e., secondary battery in Example 1) was produced by using the cathode, the anode and the non-aqueous electrolyte solution thus prepared.

The produced lithium ion secondary battery was charged/discharged at 25° C., and an initial discharge capacity thereof was measured. At that time, the battery was charged at a constant current and voltage using a charge current of 0.2 CA up to a charge end voltage of 4.3V, and discharged at a constant current using a discharge current of 0.2 CA down to a discharge end voltage of 3.3V. As a result, the initial discharge capacity was 196 Ah/kg. Note, the term of "kg" in the unit of "Ah/kg" means a mass of the cathode active substance. The definition is the same as in the following descriptions.

Further, another lithium secondary battery was produced the same as in above except that graphite was used instead of the lithium metal for preparing an anode. The produced lithium ion battery was charged/discharged under a condition of 25° C. or less, and a resistance increase rate thereof associated with charge/discharge cycles was evaluated. More specifically, the resistance increase rate was evaluated as the following procedure.

The produced secondary battery was charged at a constant current and voltage using a charge current of 1 CA up to a charge end voltage of 4.2 V, and then discharged at a constant current using a discharge current of 1 CA down to a discharge end voltage of 3.2 V, thereby charged/discharged for 2 cycles. After that, an initial DC resistance value was measured at SOC 50%. Further, the secondary battery was repeatedly charged/discharged for 300 cycles at 25° C. with a charge/discharge current of 1 CA, a charge end voltage of 4.2 V and a discharge end voltage of 3.2 V.

After completion of 300 cycles, a DC resistance value was measured at a voltage used for measuring the initial DC resistance value. A resistance increase rate was calculated via dividing the DC resistance value thus measured at the $300^{th}$ cycle by the initial DC resistance value. As a result, the resistance increase rate was calculated to be 48%.

Example 2

A cathode active substance (i.e., cathode active substance in Example 2) was prepared the same as in Example 1 except that lithium carbonate, nickel hydroxide, cobalt carbonate, manganese carbonate and titania were used as starting raw materials, and those raw materials were weighed with amounts in use so that the atomic ratio of Li:Ni:Co:Mn:Ti was 1.04:0.79:0.15:0.05:0.01. Hereby, in Example 2, a raw material including titanium was used from the beginning, being different from Example 1 in which a raw material including titanium was added in the middle.

The obtained cathode active substance was analyzed by ICP and XPS similarly to Example 1. As a result, the composition ratio (mol ratio) of Li:Ni:Co:Mn:Ti was determined to 1.02:0.79:0.15:0.05:0.01. Accordingly, it was determined that the composition formula of the obtained cathode active substance was $Li_{1.02}Ni_{0.79}Co_{0.15}Mn_{0.05}Ti_{0.01}O_2$. Further, although it is not shown, an X-ray diffraction measurement of the obtained cathode active substance thus performed the same as in Example 1 afforded a diffraction pattern corresponding to the α-$NaFeO_2$ layered structure. The atomic ratio of $T^{3+}$ per $T^{4+}$ ($T^{3+}/T^{4+}$) was determine to be 2.0

Further, the obtained cathode active substance was analyzed the same as in Example 1 to measure a BET specific surface area, porosity Pi, porosity Pp, a value of Pp/Pi and crushing strength thereof. Accordingly, the BET specific surface area was 0.8 $m^2/g$, the porosity Pi was 11%, the porosity Pp was 12%, the value of Pp/Pi was 1.1, and the crushing strength was 61 MPa, respectively.

Then, a lithium ion secondary battery (i.e., secondary battery in Example 2) was produced by using the obtained cathode active substance the same as in Example 1. Then, using the prepared lithium ion secondary battery, an initial discharge capacity and a resistance increase rate were measured the same as in Example 1. As a result, the initial discharge capacity was determined to be 190 Ah/kg, and the resistance increase rate was determined to be 39%.

Comparative Example 1

A cathode active substance and a lithium ion secondary battery (i.e., cathode active substance and secondary battery in Comparative Example 1) were produced the same as in Example 1 except that no titanium-containing chelate agent was added and the heat-treating temperature in the third heat-treating step S33 was set to "750° C." instead of "785° C.".

Next, the obtained cathode active substance was analyzed by ICP and XPS the same as in Example 1. The result of the analysis showed a composition ratio (mol ratio) of Li:Ni:Co:Mn was 1.02:0.80:0.15:0.05. As a result, it was determined that a composition formula of the obtained cathode active substance was $Li_{1.02}Ni_{0.80}Co_{0.15}Mn_{0.05}O_2$. Further, although it is not shown, an X-ray diffraction measurement of the obtained cathode active substance thus performed the same as in Example 1 afforded a diffraction pattern corresponding to the $\alpha$-$NaFeO_2$ layered structure.

Further, the obtained cathode active substance was analyzed the same as in Example 1 to measure a BET specific surface area, porosity Pi, porosity Pp, a value of Pp/Pi and crushing strength thereof. Accordingly, the BET specific surface area was 0.7 m$^2$/g, the porosity Pi was 14%, the porosity Pp was 42%, the value of Pp/Pi was 3.0, and the crushing strength was 109 MPa, respectively. Note, the atomic ratio of $T^3$ per $T^{4+}$ ($T^{3+}/T^{4+}$) was not measured because no titanium-containing chelate agent was added in Comparative Example 1.

Moreover, using the prepared lithium ion secondary battery, an initial discharge capacity and a resistance increase rate thereof were measures the same as in Example 1. As a result, the initial discharge capacity was determined to be 197 Ah/kg, and the resistance increase rate was determined to be 153%.

Comparative Example 2

A cathode active substance and a lithium ion secondary battery (i.e., cathode active substance and secondary battery in Comparative Example 2) were produced the same as in Comparative Example 1 except that the heat-treating temperature and time in the finishing heat-treating step S33 were set to "at 750° C. for 1 hr" instead of "at 750° C. for 10 hr".

Next, the obtained cathode active substance was analyzed by ICP and XPS the same as in Example 1. The result of the analysis showed a composition ratio (mol ratio) of Li:Ni:Co:Mn was 1.02:0.80:0.15:0.05. As a result, it was determined that a composition formula of the obtained cathode active substance was $Li_{1.02}Ni_{0.80}Co_{0.15}Mn_{0.05}O_2$. Further, although it is not shown, an X-ray diffraction measurement of the obtained cathode active substance thus performed the same as in Example 1 afforded a diffraction pattern corresponding to the $\alpha$-$NaFeO_2$ layered structure.

Further, the obtained cathode active substance was analyzed the same as in Example 1 to measure a BET specific surface area, porosity Pi, porosity Pp, a value of Pp/Pi and crushing strength thereof. Accordingly, the BET specific surface area was 1.2 m$^2$/g, the porosity Pi was 24%, the porosity Pp was 41%, the value of Pp/Pi was 1.7, and the crushing strength was 44 MPa. Note, the atomic ratio of $T^{3+}$ per $T^{4+}$ ($T^{3+}/T^{4+}$) was not measured because no titanium-containing chelate agent was added in Comparative Example 2.

Moreover, using the produced lithium ion secondary battery, an initial discharge capacity thereof and a resistance increase rate thereof were measures the same as in Example 1. As a result, the initial discharge capacity was determined to be 192 Ah/kg, and the resistance increase rate was determined to be 110%.

DISCUSSION

Table 1 summarized the results as described above.

TABLE 1

| | Cathode Active Substance | | | | | | Secondary Battery | |
|---|---|---|---|---|---|---|---|---|
| | Porosity Pi (%) | Porosity Pp (%) | Pp/Pi (—) | $Ti^{3+}/Ti^{4+}$ | BET Specific Surface Areas (m2/g) | Crushing Strength (MPa) | Initial Discharge Capacity (Ah/kg) | Resistance Increase Rate (%) |
| Example 1 | 10 | 9 | 0.9 | 1.9 | 1.3 | 67 | 196 | 48 |
| Example 2 | 11 | 12 | 1.1 | 2.0 | 0.8 | 61 | 190 | 39 |
| Comparative Example 1 | 14 | 42 | 3.0 | — | 0.7 | 109 | 197 | 153 |
| Comparative Example 2 | 24 | 41 | 1.7 | — | 1.2 | 44 | 192 | 110 |

In Examples 1 and 2 having values of Pp/Pi of 1.5 or less respectively, the secondary batteries had the same level of initial discharge capacities as in Comparative Examples 1 and 2, whereas the resistance increase rates associated with the charge/discharge cycles were extremely suppressed to be a small value. The resistance increase rates of Examples 1 and 2 were especially smaller than those of Comparative Examples 1 and 2 by ca. 50% (Example 1 vs. Comparative Example 2) to ca. 75% (Example 2 vs. Comparative Example 1). This result reveals that the secondary batteries in Examples 1 and 2 are excellent in the cycle property.

Further, the result also indicates that only the increase in the crushing strength of the cathode active substance is not sufficient to suppress the resistance increase rate. For example, conventionally it had been considered that Comparative Example 1 showing the large crushing strength was excellent in the battery property. However, in fact, Comparative Example 1 showed the most large resistance increase rate among Examples 1 and 2 as well as Comparative Examples 1 and 2, to show a poor battery property.

In Contrast, Example 2 and Comparative Example 2 showed relatively close values of the crushing strength, while the resistance increase rate in Example 2 was about ⅓ of the resistance increase rate in Comparative Example 2. Therefore, conventionally it had been considered that Example 2 and Comparative Example 2 showed a comparative battery property. However, in fact, it was determined that Example 2 showed a superior cycle property to Comparative Example 2.

As mentioned hereinbefore, a cathode active substance having a small increase in the number of the opening pores 32 when stressed by a press with a Pp/Pi value of 1.5 or less suppresses the increase in the number of the opening pores 32 thus caused by the stress following the volume change after the charge-discharge cycles. This prevents generation of a new contact surface to the non-aqueous electrolyte solution. Accordingly, it is shown that such a cathode active substance can achieve a small resistance increase rate and an excellent charge/discharge cycle property.

DESCRIPTION OF REFERENCE NUMERALS

10: Primary Particle
20: Secondary Particle
30: Opening Pore
31: Closed Pore
32: Opening Pore (i.e., Opening Pore converted from Closed Pore)
100: Secondary Battery (i.e., Lithium Ion Secondary Battery)
111: Cathode
111a: Cathode Current Collector
111b: Cathode Mixture Layer
112: Anode
113: Separator

The invention claimed is:

1. A cathode active substance used for a lithium ion secondary battery, the cathode active substance comprising: a lithium composite compound represented by the following Formula (1):

$$Li_{1+\alpha}Ni_xCo_yM^1_{1-x-y-z}Ti_zO_{2+\beta} \quad \text{Formula (1)}$$

where "α", "β", "x", "y" and "z" are respectively numbers satisfying the following conditions: $-0.03 \leq \alpha \leq 0.08$, $-0.2 \leq \beta \leq 0.2$, $0.7 \leq x \leq 0.9$, $0.03 \leq y \leq 0.3$, $0 \leq z \leq 0.1$, $M^1$ is at least one element selected from Mn and Al, wherein when Pi is defined as porosity in an initial state before charge/discharge operation and before being pressed with respect to an opening diameter of 0.6 μm or less, the porosity Pi being measured by subjecting the cathode active substance to a mercury press-in method, and when Pp is defined as porosity with respect to an opening diameter of 0.6 μm or less, the porosity Pp being measured by filing the cathode active substance in a mold with an inner diameter of 10 mm, pressing the substance thus filled therein by a load of 40 MPa, thereby subjecting the pressed substance to a mercury press-in method, a value of Pp/Pi is 1.5 or less, and an atomic ratio of $Ti^{3+}$ to $Ti^{4+}$ ($Ti^{3+}/Ti^{4+}$) is 1.5 or more and 20 or less based on an X-ray photoelectron spectroscopic analysis.

2. The cathode active substance used for a lithium ion secondary battery according to claim 1, wherein the porosity Pp is 20% or less.

3. A cathode used for a lithium ion secondary battery, the cathode comprising a cathode active substance used for a lithium ion secondary battery according to claim 1.

4. A lithium ion secondary battery, the secondary battery comprising a cathode used for a lithium ion secondary battery according to claim 3.

* * * * *